G. H. F. HOLY.
CORE MEMBER FOR DYNAMO ELECTRIC MACHINES.
APPLICATION FILED JULY 14, 1915.

1,305,604.

Patented June 3, 1919.

WITNESSES:
R. J. Ridge.
O. W. Kennedy

INVENTOR
George H. F. Holy.
BY
Wesley G. Carr
ATTORNEY

UNITED STATES PATENT OFFICE.

GEORGE H. F. HOLY, OF PITTSBURGH, PENNSYLVANIA, ASSIGNOR TO WESTINGHOUSE ELECTRIC AND MANUFACTURING COMPANY, A CORPORATION OF PENNSYLVANIA.

CORE MEMBER FOR DYNAMO-ELECTRIC MACHINES.

1,305,604.　　　Specification of Letters Patent.　　Patented June 3, 1919.

Application filed July 14, 1915. Serial No. 39,795.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Core Members for Dynamo-Electric Machines, of which the following is a specification.

My invention relates to laminated cores for dynamo-electric machines, and it has for its object to provide a structure comprising a minimum number of component parts that may be readily assembled and retained in their operating positions.

Laminated cores of dynamo-electric machines, as heretofore constructed, usually comprised a suitable supporting member or spider upon which were assembled a plurality of annular plates that were suitably secured in position by the use of retaining rings. Such cores were also provided with peripheral slots for the reception of current-carrying conductors and, in order to prevent the plates from turning and cutting the insulation of such conductors, it was usual to provide one or a number of keys to engage suitable keyways formed in the laminations and the supporting member to maintain the core slots in correct alinement.

According to the present invention, I provide a laminated core in which the turning of the plates with respect to each other is prevented without the use of keys and keyways, as described above.

Figure 1:
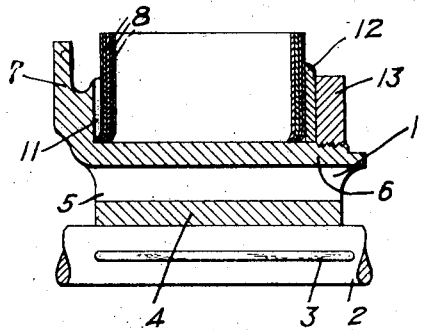
Figure 2:
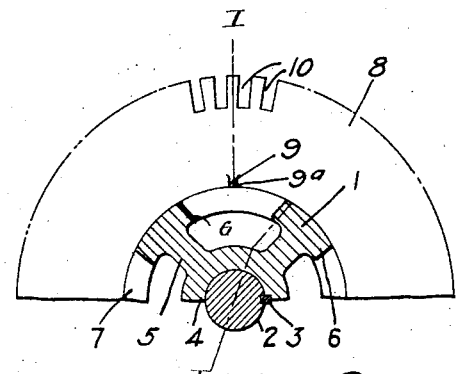
Figure 3:
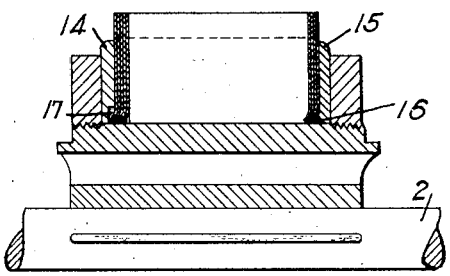
Figure 4:
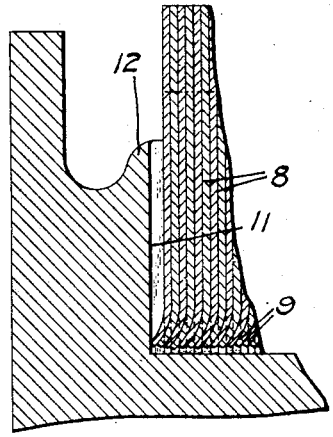
Figure 5:
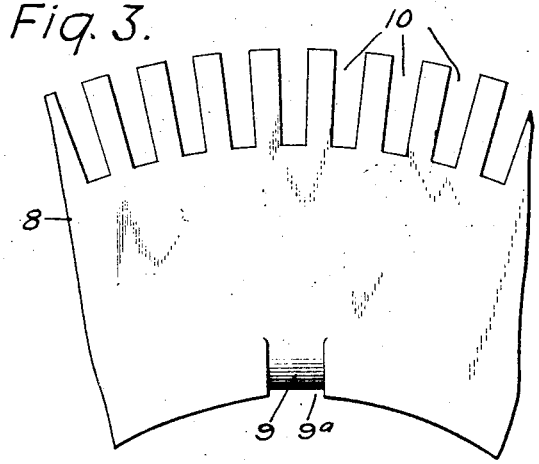

In the accompanying drawings, Figure 1 is a sectional view of a portion of a laminated core structure of a dynamo-electric machine; Fig. 2 is a sectional view taken in a plane perpendicular to that of Fig. 1 which is a section along a line I—I of Fig. 2; Fig. 3 is a sectional view similar to Fig. 1 and showing a modification of my invention; Fig. 4 is a sectional view of a portion of the parts shown in Fig. 1, and Fig. 5 is a view of a portion of a plate member.

A supporting member or spider 1 is secured to a shaft 2 by means of a key 3, and comprises a hub 4 and a plurality of radial ribs 5 that terminate in curved rim portions 6. The rim portions 6 present substantially equal arcs and are joined, at one end of the spider, by an outwardly extending annular flange 7. Annular plates 8, constituting the core, are assembled upon the rim portions 6 of the spider 1, preferably with a pressed fit. As best shown in Figs. 4 and 5, the plates 8 are severally formed with a portion of the material adjacent the inner periphery thereof forced outwardly to lie in a plane different from that of the plate, thus providing an offset or tongue 9 and a corresponding opening $9^a$. Each plate 8 is further provided with outer peripheral slots 10 that may be formed by punching, or otherwise at the same time the tongue 9 is formed. The plates 8 are assembled upon the spider 1 with corresponding peripheral slots 10 in alinement and with the tongue 9 of each plate engaging the corresponding openings $9^a$ of the adjacent plates. A suitable recess 11 is provided in the flange 7 for the reception of the tongues 9 of the adjacent plates 8. The assembled plates 8 are pressed closely together and secured upon the spider 1 by means of an end ring 12, and a nut 13 that is in threaded engagement with the rim portions 6. A modification of my invention is shown in Fig. 3 wherein end rings 14 and 15 are provided upon each end of the spider. The end ring 14 is provided with a notch 17 for the reception of the tongues 9, and the end ring 15 is provided with a projection 16 which engages the openings $9^a$ of the plates adjacent thereto.

From the foregoing, it is apparent that angular displacement of the plates with respect to each other and also with respect to the spider will be prevented by the engagement of the tongues of each plate with the openings of the adjacent plates and with the end members of the spider. In this way, the insulation of the conductors carried in the slots 10 will be protected.

While I have shown my invention in a simple and preferred form and as embodied in a particular type of laminated structure, it is not so limited but is susceptible of various minor changes and modifications within the scope of the appended claims.

I claim as my invention:

1. A laminated structure comprising a cylindrical supporting member, a plurality of annular plates mounted on the said member and provided with outwardly extending slots on the inner periphery and alined offset portions adjacent said slots, and retaining end members for the said plates respectively having a recess and a projecting portion coacting with the off-set portions of adjacent plates.

2. A laminated structure comprising a supporting member, a plurality of annular plates mounted on the said member and provided with outwardly extending slots on the inner periphery, and alined off-set portions adjacent said slots, and retaining end members for the said plates, one of which is provided with a recess into which the offset portions of adjacent plates project.

3. A laminated structure comprising a supporting member and a plurality of annular plates mounted on the said member and severally having outwardly extending slots on the inner periphery thereof, and having tongues adjacent said slots bent outwardly to a plane different from that of the plate, the said plates being so arranged that the tongue of one plate lies within the plane of the adjacent plate.

4. A laminated structure comprising a supporting member and a plurality of annular plates mounted on the said member and provided with outwardly extending slots on the inner periphery and with offset portions adjacent said slots, the said plates being so arranged that the said slots are in alinement and the off-set portion of each plate registers with the off-set portions of the adjacent plates.

5. A laminated structure comprising a supporting member and a plurality of annular plates mounted on the said member and provided with two outwardly extending slots on the inner periphery of each of said plates, and having the resultant tongue bent so as to extend into an opening produced by correspondingly bending the tongue of the next adjacent plate.

In testimony whereof, I have hereunto subscribed my name this 29th day of June, 1915.

GEORGE H. F. HOLY.

Copies of this patent may be obtained for five cents each, by addressing the "Commissioner of Patents, Washington, D. C."